Patented Aug. 9, 1932

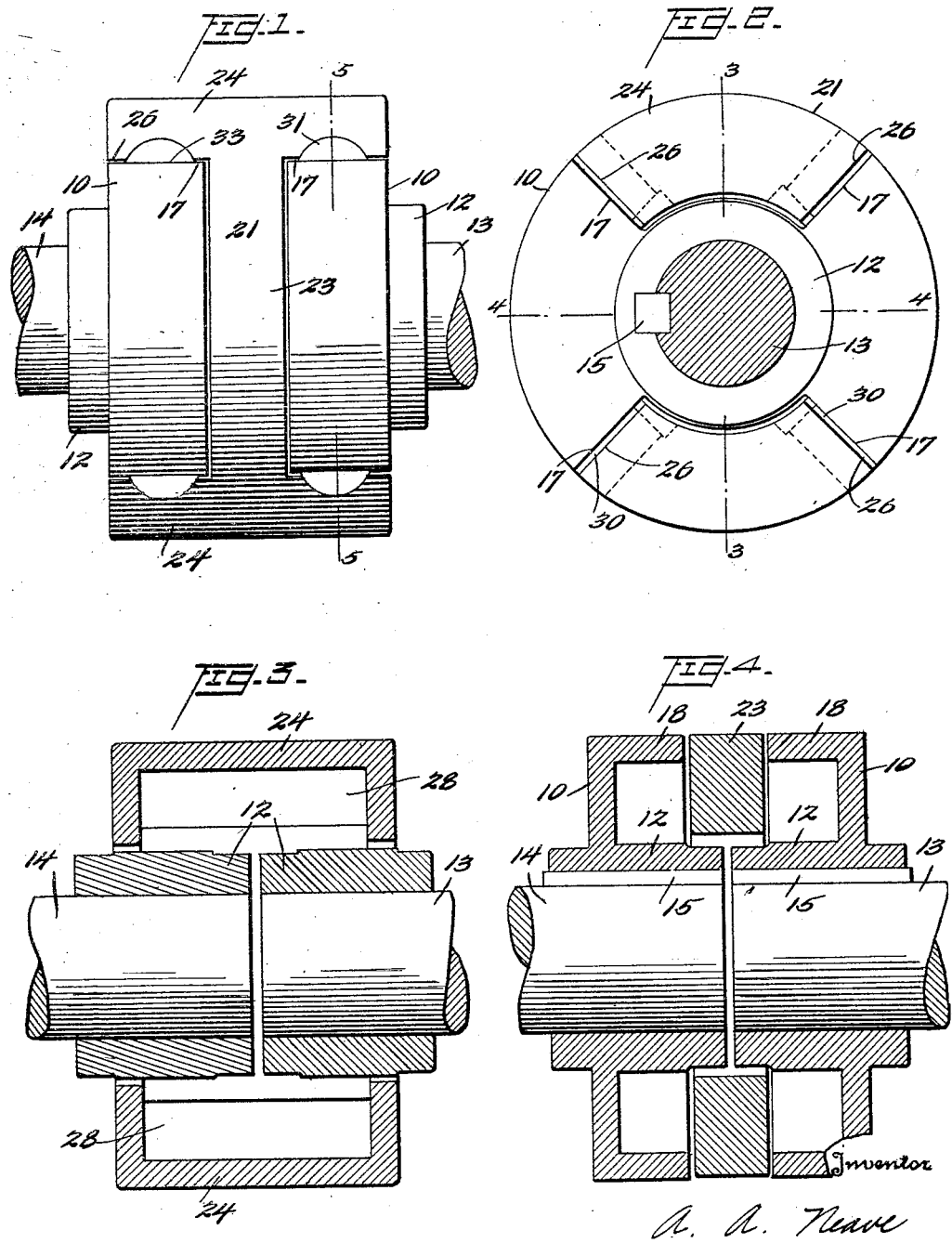

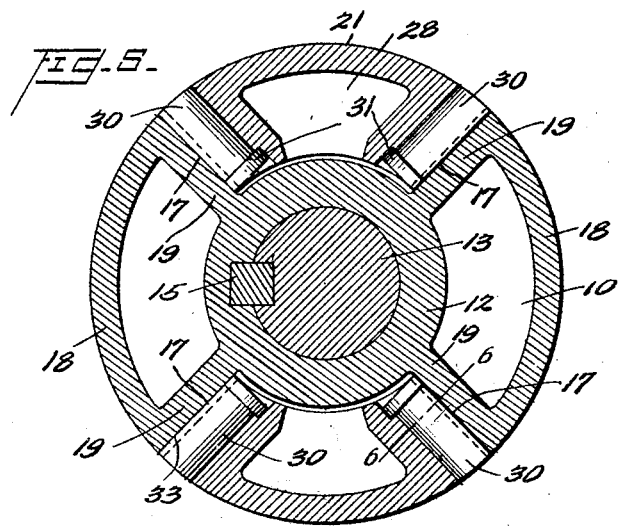
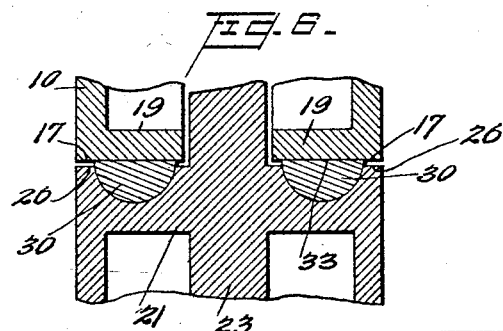
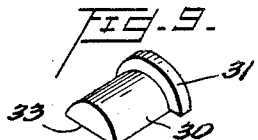
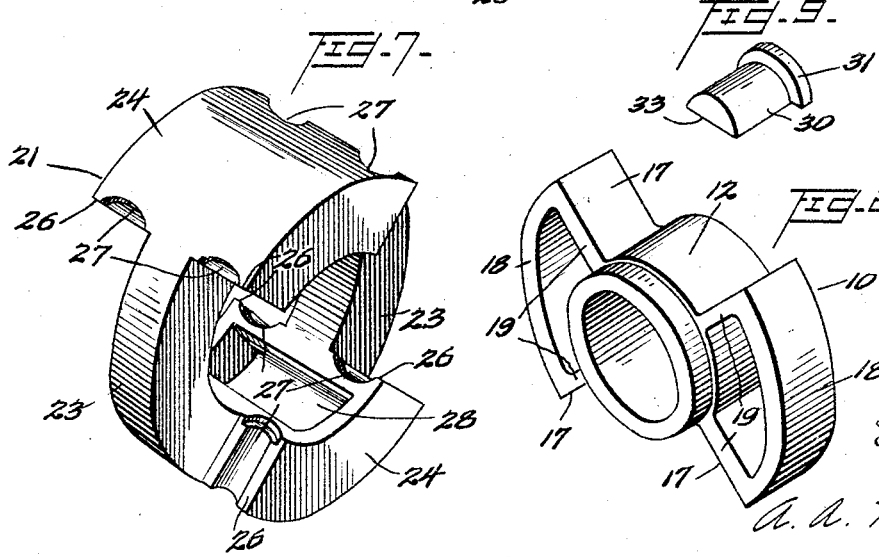
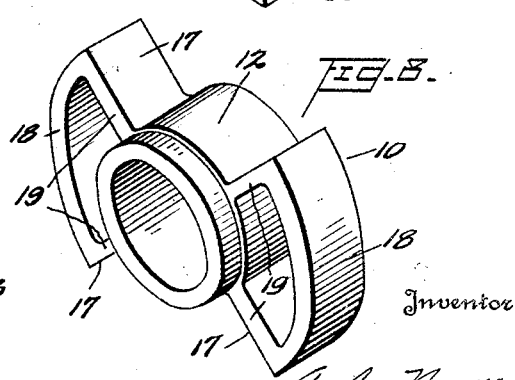

1,870,343

UNITED STATES PATENT OFFICE

ANDREW A. NEAVE, OF EASTON, PENNSYLVANIA, ASSIGNOR TO TREADWELL ENGINEERING COMPANY, OF EASTON, PENNSYLVANIA, A CORPORATION OF PENNSYLVANIA

FLEXIBLE COUPLING

Application filed February 12, 1929. Serial No. 339,436.

This invention relates to shaft couplings, and more particularly to that type of coupling which permits of faulty alignment, or slight relative angular and bodily movement of the coupling members.

It is a general object of the invention to provide a coupling of this character which is simple to construct, efficient in operation, and which combines a maximum of strength with a minimum of weight.

It is a further object of the invention to provide a coupling which is extremely compact, and in which there are no unbalanced centrifugal forces.

It is a feature of the improved coupling disclosed herein that the torque is transmitted thru surfaces which are disposed in perpendicular planes intersecting substantially at the axis of the coupling, the driving parts partaking of slight sliding and rocking movements in these planes to permit misalignment of the coupled members.

It is a further object of the invention to provide a new and improved bearing member for use between the component driving parts of the coupling.

Further objects and features of the invention will be apparent from the following description thereof taken in connection with the accompanying drawings, in which:

Figure 1 is an elevation of a coupling constructed in accordance with my invention;

Figure 2 is an end view of the coupling;

Figure 3 is a section on the line 3—3 of Figure 2;

Figure 4 is a section on the line 4—4 of Figure 2;

Figure 5 is a section on the line 5—5 of Figure 1;

Figure 6 is a partial section on the line 6—6 of Figure 5; and

Figures 7, 8 and 9 are perspective views of the component parts of the coupling.

In the embodiment of the invention illustrated herein, the coupling has been shown in use for connecting two shaft sections, but it will be understood that the invention may be applied to other uses and is applicable for connecting any two rotating parts in the event that it is necessary to compensate for slight misalignment of the axes of the parts. Each coupling comprises a pair of similar elements 10, one of which constitutes a driving and the other a driven element, and in the drawings these elements are shown as provided with hubs 12 which are adapted to be keyed on adjacent shaft sections 13, 14 as indicated at 15 in Figure 2, or in any other suitable manner.

Each element 10 is formed with a pair of abutments 17, formed integrally with the hub 12, extending radially thereof and diametrically opposed. As will be seen from an inspection of Figure 8 of the drawings, in which one of these elements is illustrated, each of these abutments is constructed in such a way that a maximum of strength and a minimum of weight is obtained, the abutments each comprising an annular rim portion 18 connected by web portions 19 to the hub 12. It will thus be seen that the abutments constitute hollow substantially sector-shaped elements. The faces of the webs 19 constitute driving surfaces, and these surfaces are disposed at intervals of 90° about the circumference of the hub 12, and are located in planes which intersect at the axis of the element.

An intermediate member indicated at 21, and separately disclosed in Figure 7 of the drawings, is adapted to transmit the torque between the similar driving and driven elements. For this purpose the member 21 is formed with an annular body portion 23 which is enlarged at diametrically opposite points to form wings 24, extending laterally of the member 23 on each side thereof. These wings are adapted for cooperation with the corresponding abutments 17 on the driving and driven elements, and for this purpose are formed with driving surfaces 26 disposed at intervals of substantially 90°, and similarly located in planes intersecting at approximately the axis of the intermediate member. Since the wings 24 are intended for insertion between the abutments 17 on the driving and driven elements, it is obvious that either the wings or the abutments or both must occupy arcs of slightly less than 90°, in order that clearance may be provided between these cooperating driving parts. In the drawings the abutments 17 are shown as extending thru the full 90° arc, and the wings 24 extend thru a slightly smaller arc, but it will be understood that this arrangement is purely optional. In order to decrease the weight without sacrificing the strength of the intermediate member, it is preferred to remove a portion of the metal therefrom at the wider part of the member which comprises the wings 24 as indicated at 28.

Figure 9 illustrates the improved bearing member which is inserted between the cooperating driving surfaces on the driving and driven members and the intermediate member, and comprises a substantially semi-cylindrical block 30 having a semi-annular flange 31 formed on the periphery thereof and preferably at one end of the cylindrical portion. One of these bearing blocks is adapted to fit in each of the driving surfaces 26 of the intermediate member 21, the face 26 being correspondingly recessed as indicated at 27 to accommodate the cylindrical portion and the flanged portion of the bearing block, the flat side 33 of the block facing outwardly. It will be noted that the depth of the recess for receiving the bearing block is slightly less than the thickness of the block so that the latter projects from the driving surface 26 of the intermediate member, attention being directed to Figure 6 of the drawings, in which this construction is clearly shown. It will thus be noted that when the parts occupy their assembled position, sufficient clearance is provided between the driving and driven elements and the intermediate element to permit slight relative rocking movement, whereas the bearing blocks 30 serve to connect these elements for positive rotation in either direction and to eliminate all play and backlash.

It is believed that the operation of the device will be apparent from the above description of the component parts. The driving and driven elements, which may be mounted on adjacent shaft sections or other rotating parts which it is desired to couple, are connected by the intermediate element 23 which interlocks therewith in the manner shown in Figures 1 and 2 of the drawings, the hubs 12 of the driving and driven elements fitting within the intermediate member as shown in Figures 3 and 4 to provide a compact arrangement. It will be seen that the parts may be assembled by relative axial movement thereof after the bearing blocks 30 have been placed in the recesses 26 adapted for their reception. In the event that the axes of the driving and driven elements are slightly inclined or are offset, the axis of the intermediate member will also be inclined with respect to one or both of these elements, and as the parts are rotated, there will be a combined sliding and rocking movement of the driving surfaces relative to each other. The driving surfaces on the driving and driven members slide on the flat faces 33 of the bearing blocks, and rock the latter to and fro in their recesses. For each rotation of the coupling, assuming that the driving and driven members are not in alignment, each rocking member will make one complete oscillation to and fro. It will thus be seen that this invention contemplates the provision of an extremely simple and effective coupling for permitting relative angular movement or displacement of a driving and a driven element, and at the same time effecting a positive and well balanced drive.

Since the three principal parts of the coupling are not in direct contact, but are connected thru the bearing blocks 30, the coupling may be used to insulate a driving and driven member, such as a pair of adjacent shaft sections, by forming the bearing blocks of non-conducting material, such as wood, rubber, or fibrous compositions. Such an arrangement is particularly useful in insulating shafting from a driving electric motor.

It will be understood that the invention is not limited to the above described embodiment, which is simply presented for the purpose of illustration, but may be modified within the scope of the appended claims.

Having thus described the invention, what is claimed as new and desired to be secured by Letters Patent is:

1. In apparatus of the class described, the combination with a pair of driving and driven elements, each of which comprises a body portion and a plurality of abutments extending radially outward from said body portion to provide flat driving surfaces disposed at intervals of 90° about the body portion, alternate surfaces being opposed to each other, of an intermediate torque transmitting member comprising a body portion and a plurality of abutments on opposite sides thereof to provide flat driving surfaces on each side disposed at intervals of 90° about the body portion and arranged to oppose the corresponding surfaces on said driving and driven elements, and a plurality of semi-cylindrical bearing blocks adapted to seat in correspondingly shaped recesses in the driving surfaces of the intermediate member and having flat surfaces for engagement with the opposing driving surfaces on the driving and driven members, whereby the latter may partake of a combined sliding and rocking movement with respect to the intermediate member to compensate for faulty alignment of the driving and driven members, and to permit slight relative angular and bodily movement thereof.

2. In apparatus of the class described, the combination with a pair of driving and driven elements, each of which comprises a body portion and a plurality of abutments extending radially outward from said body portion to provide flat driving surfaces disposed at intervals of 90° about the body portion, alternate surfaces being opposed to each other, of an intermediate torque transmitting member comprising a body portion and a plurality of abutments on opposite sides thereof to provide flat driving surfaces on each side disposed at intervals of 90° about the body portion and arranged to oppose the corresponding surfaces on said driving and driven elements, and a plurality of semi-cylindrical bearing blocks each having a semi-annular retaining rib thereon, adapted to seat in correspondingly shaped recesses in the driving surfaces of the intermediate member and having flat surfaces for engagement with the opposing driving surfaces on the driving and driven members, whereby the latter may partake of a combined sliding and rocking movement with respect to the intermediate member to compensate for faulty alignment of the driving and driven members, and to permit slight relative angular and bodily movement thereof.

3. In apparatus of the class described, the combination with a pair of driving and driven elements, each of which comprises a hollow hub portion adapted to receive a shaft end, and a pair of diametrically opposite abutments formed on the hub and extending radially thereof, each abutment extending thru an arc of substantially 90° and having a flat driving surface at each end thereof, the driving surfaces lying in planes intersecting approximately at the axis of the element, of an intermediate torque transmitting member comprising a body portion and a plurality of abutments extending laterally on each side thereof, each abutment extending thru an arc of substantially 90° and having flat driving surfaces at each end thereof lying in planes intersecting approximately at the axis of the member, whereby said driving and driven elements and said intermediate member may be assembled with their abutments interlocking, the parts being so dimensioned that clearance is provided between the opposing driving surfaces on the cooperating members, and a plurality of semi-cylindrical bearing blocks adapted to seat in correspondingly shaped recesses in the driving surfaces of the intermediate member and having flat surfaces for engagement with the opposing driving surfaces on the driving and driven members, whereby the latter may partake of a combined sliding and rocking movement with respect to the intermediate member to compensate for faulty alignment of the driving and driven members, and to permit slight relative angular and bodily movement thereof.

4. In a shaft coupling, the combination with a pair of driving and driven elements, each of which comprises a hollow hub portion adapted to receive a shaft end and a pair of diametrically opposed abutments formed on the hub, each abutment comprising a radially projecting sector-shaped part occupying an arc of substantially 90° and provided with a flat bearing surface at each end thereof, said bearing surfaces lying in planes intersecting at approximately the axis of the element, of an intermediate torque transmitting member comprising an annular ring having two diametrically opposed portions enlarged in width to form abutments extending laterally of said ring, each abutment extending thru an arc of substantially 90° and having flat driving surfaces at each end thereof lying in planes intersecting approximately at the axis of the member, whereby said driving and driven elements and said intermediate member may be assembled with their abutments interlocking, the parts being so dimensioned that clearance is provided between the opposing driving surfaces on the cooperating members, and bearing members inserted between said opposing surfaces.

5. In a shaft coupling, the combination with a pair of driving and driven elements, each of which comprises a hollow hub portion adapted to receive a shaft end and a pair of diametrically opposed abutments formed on the hub, each abutment comprising a radially projecting sector-shaped part occupying an arc of substantially 90° and provided with a flat bearing surface at each end thereof, said bearing surfaces lying in planes intersecting at approximately the axis of the element, and means including an annular intermediate torque transmitting member for coupling said parts, the hollow hub portions of said driving and driven elements extending into and substantially abutting within said annular transmitting member, and the abutments on said driving element and said driven element being axially spaced to accommodate a portion of the said intermediate torque transmitting member therebetween.

6. In a shaft coupling, the combination with a driving and a driven element adapted to be secured to the ends of adjacent shaft sections, of an intermediate torque transmitting member, and bearing blocks for transmitting force from said driving element to said intermediate member and from said intermediate member to said driven element, said bearing blocks being formed of non-deformable electrical insulating material and constituting a spacing means and the sole connecting means between said elements and member whereby the passage of electrical currents from one shaft section to the other is prevented.

In testimony whereof I hereunto affix my signature.

ANDREW A. NEAVE.